Patented July 12, 1932

1,866,956

UNITED STATES PATENT OFFICE

EDUARD TSCHUNKUR, OF COLOGNE-MULHEIM, FRITZ BALLAUF, OF ELBERFELD, AND ERNST HERDIECKERHOFF, OF OPLADEN, GERMANY, ASSIGNORS TO GENERAL ANILINE WORKS, INC., OF NEW YORK, N. Y., A CORPORATION OF DELAWARE

PHENYL-INDOL-SULPHONIC ACIDS

No Drawing. Application filed August 29, 1930, Serial No. 478,784, and in Germany February 11, 1928.

The present invention relates to a process of preparing phenyl indol-sulphonic acids and to the new compounds obtainable thereby, more particularly it relates to compounds of the probable general formula:

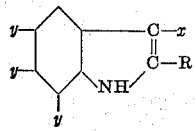

wherein R stands for a methyl or ethyl group or for a radical of the benzene series, $x$ stands for hydrogen or in case R means "alkyl" also for a methyl group, or $x$ and R jointly stand for the tetra-methylene radical, one $y$ stands for a sulphonic acid group and the other $y$'s stand for hydrogen.

The process is carried out by heating with an acid condensing agent a ketone hydrazone of the general formula:

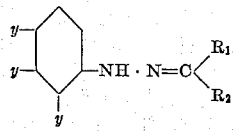

wherein one $y$ stands for a sulphonic acid group, the other $y$'s stand for hydrogen, $R_1$ stands for methyl or ethyl, and $R_2$ stands for methyl, ethyl or a radical of the benzene series, but $R_1$ and $R_2$ not simultaneously standing for ethyl and a radical of the benzene series, or $R_1$ and $R_2$ jointly stand for the penta-methylene radical, the reaction proceeds with formation of the indole nucleus according to the following equation:

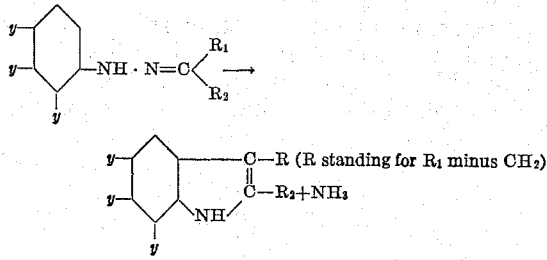

As condensing agents we mention by way of example zinc chloride and a 70–90% sulphuric acid; in using the first mentioned condensing agent we are working at temperatures between about 150–200° C., while, when performing the condensation in sulphuric acid, we prefer to work at somewhat lower temperatures, say between 100 and 150° C., in order to avoid a simultaneous sulphonation.

The phenyl indol-sulphonic acids are isolated from the reaction mixtures in a manner more fully described in the examples.

The starting ketone hydrazone sulphonic acids of the general formula:

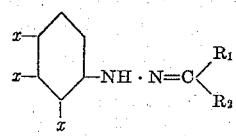

are obtainable in a convenient manner by heating at temperatures between about 50 and 100° C. about equimolecular proportions of a water soluble salt, especially alkali metal salt, of a phenyl-hydrazine-o-, m- or p-sulphonic acid and acetone, methyl-ethyl-ketone, diethyl-ketone, a methyl-phenyl-ketone or cyclohexanone in aqueous solution neutrally reacting to litmus.

The phenyl-indol-sulphonic acids prepared according to our process are generally colorless, crystalline substances, easily soluble in water in the form of their alkali metal salts and are valuable intermediate products in the manufacture of dyestuffs.

The invention is illustrated by the following examples, without being limited thereto:

EXAMPLE 1: 10 kg. of hydrazone, prepared from o-phenyl-hydrazine-sulphonic acid and acetophenone, are molten together with 50 kg. of zinc chloride; the reaction is vigorous, and the temperature quickly rises to 200° C. Then the melt is poured into water and filtered off from the 2-phenylindol-7-sulphonic acid of the following formula:

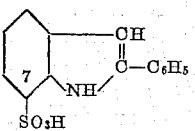

From a common salt solution the sodium salt of this 2-phenylindol-7-sulphonic acid crystallizes in small sticks; the yield is almost quantitative. The product shows the indole reaction with pine shavings.

EXAMPLE 2: 10 kg. of hydrazone from m-phenylhydrazine-sulphonic acid and acetophenone are treated with 50 kg. of zinc chloride (as described in Example 1). The 2-phenylindol-6-sulphonic acid of the following constitution is formed.

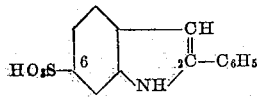

EXAMPLE 3: 10 kg. of hydrazone, obtainable from p-phenylhydrazine-sulphonic acid and acetophenone, are treated with 50 kg. of zinc chloride (as described in Example 1); thereby the 2-phenylindol-5-sulphonic acid of the following constitution is formed:

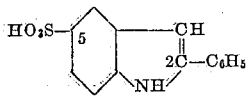

EXAMPLE 4: 10 kg. of hydrazone, prepared from o-phenylhydrazine-sulphonic acid and p-methylacetophenone, are treated with 50 kg. of zinc chloride (as described in Example 1). The 2-(p-tolyl) indol-7-sulphonic acid of the following constitution is formed:

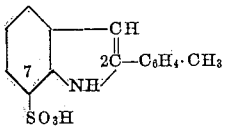

EXAMPLE 5: 10 kg. of hydrazone, obtainable from m-phenylhydrazine-sulphonic acid and p-methylacetophenone, are treated with 50 kg. of zinc chloride (as described in Example 1). The 2-(p-tolyl)indol-6-sulphonic acid formed has the following constitution:

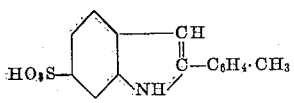

EXAMPLE 6: 10 kg. of hydrazone, obtainable from p-phenylhydrazine-sulphonic acid and p-methylacetophenone, are treated with 50 kg. of zinc chloride as described in Example 1). The 2-(p-tolyl) indol-5-sulphonic acid of the following constitution is formed:

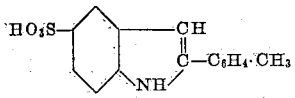

EXAMPLE 7: 10 kg. of hydrazone, obtainable from o-phenylhydrazine-sulphonic acid and p-chloroacetophenone, are treated with 50 kg. of zinc chloride (as described in Example 1). The 2-(p-chlorophenyl) indol-7-sulphonic acid of the following constitution is formed:

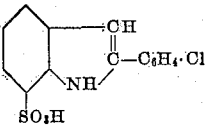

EXAMPLE 8: 10 kg. of hydrazone, obtainable from m-phenylhydrazine-sulphonic acid and p-chloroacetophenone, are treated with 50 kg. of zinc chloride (as described in Example 1). The 2-(p-chlorophenyl) indol-6-sulphonic acid of the following constitution is formed:

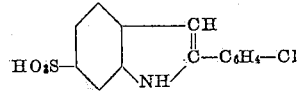

EXAMPLE 9: 10 kg. of hydrazone, obtainable from p-phenylhydrazine-sulphonic acid and p-chloro-acetophenone, are treated with 50 kg. of zinc chloride (as described in Example 1). The 2-(p-chlorophenyl)-indol-5-sulphonic acid of the following constitution is formed:

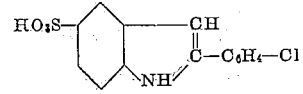

EXAMPLE 10: 1 kg. of hydrazone, obtainable from m-phenylhydrazine-sulphonic acid and acetophenone, is slowly introduced into 5 kg. of sulphuric acid (85%), and the solution formed is stirred for some time at 110–130° C. After cooling, the reaction mixture is diluted with water, and the bulk of the sulphuric acid is neutralized by the addition of slaked lime and the rest with soda. After filtering while hot, the precipitate is repeatedly washed with hot water, and the filtrates thrown together are evaporated. On cooling, the sodium salt of the 2-phenylindol-6-sulphonic acid crystallizes. The product is identical with that obtained in accordance with Example 2.

EXAMPLE 11: 10 kg. of hydrazone, obtainable from o-phenylhydrazine-sulphonic acid and acetone, are treated with 50 kg. of zinc chloride (as described in Example 1). The 2-methyl-indol-7-sulphonic acid of the following constitution is formed:

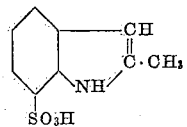

EXAMPLE 12: 10 kg. of hydrazone, obtainable from o-phenylhydrazine-sulphonic acid and diethylketone, are treated with 50 kg. of zinc chloride (as described in Example 1). The 2-ethyl-3-methylindol-7-sulphonic acid of the following constitution is formed:

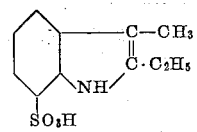

EXAMPLE 13: 10 kg. of hydrazone, obtainable from o-phenylhydrazine-sulphonic acid and cyclohexanone, are treated with 50 kg. of zinc chloride (as described in Example 1).

After recrystallization, the sodium salt of the 1·2·3·4-tetrahydrocarbazol-8-sulphonic acid having the following formula:

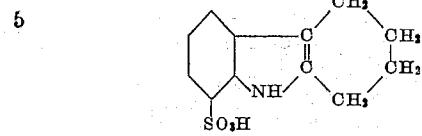

separates in beautiful crystals.

EXAMPLE 14: 10 kg. of hydrazone, obtainable from m-phenylhydrazine-sulphonic acid and cyclohexanone, are treated with 50 kg. zinc chloride (as described in Example 1). The 1·2·3·4-tetrahydrocarbazole-7-sulphonic acid of the following constitution is formed:

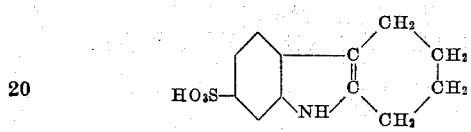

We claim:

1. The process which comprises condensing by means of an acid condensing agent a ketone hydrazone of the general formula:

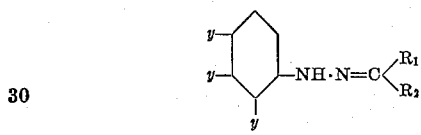

wherein one $y$ stands for a sulphonic acid group, the other $y$'s stand for hydrogen, $R_1$ stands for methyl or ethyl and $R_2$ stands for methyl, ethyl, a radical of the benzene series, but $R_1$ and $R_2$ not simultaneously standing for ethyl and a radical of the benzene series, or $R_1$ and $R_2$ jointly stand for the pentamethylene radical.

2. The process which comprises heating a ketone hydrazone of the general formula:

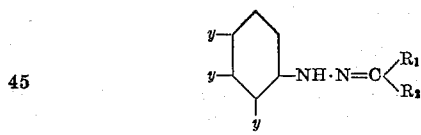

wherein one $y$ stands for a sulphonic acid group, the other $y$'s stand for hydrogen, $R_1$ stands for methyl or ethyl and $R_2$ stands for methyl, ethyl, a radical of the benzene series, but $R_1$ and $R_2$ not simultaneously standing for ethyl and a radical of the benzene series, or $R_1$ and $R_2$ jointly stand for the pentamethylene radical in zinc chloride as condensing agent at a temperature of 150–200° C.

3. The process which comprises heating a ketone hydrazone of the general formula:

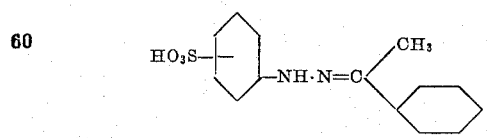

in zinc chloride as condensing agent at a temperature of 150–200° C.

4. The process which comprises heating a ketone hydrazone of the following formula:

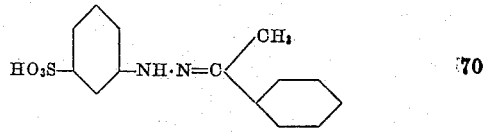

in zinc chloride as condensing agent at a temperature of 200° C.

5. The process which comprises heating a ketone hydrazone of the general formula:

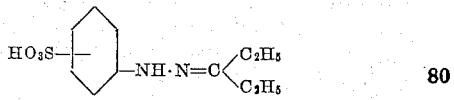

in zinc chloride as condensing agent at a temperature of 150–200° C.

6. The process which comprises heating a ketone hydrazone of the following formula:

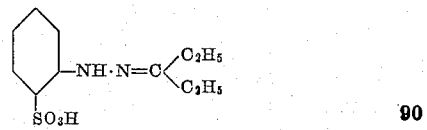

in zinc chloride as condensing agent at a temperature of 200° C.

7. The process which comprises heating a ketone hydrazone of the general formula:

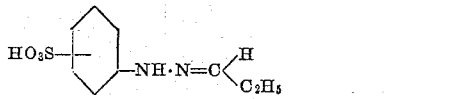

in zinc chloride as condensing agent at a temperature of 150–200° C.

8. The process which comprises heating a ketone hydrazone of the following formula:

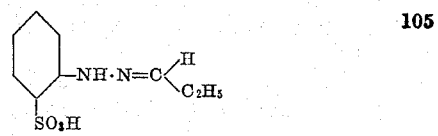

in zinc chloride as condensing agent at a temperature of 200° C.

9. As new products phenyl-indol-sulphonic acids of the probable general formula:

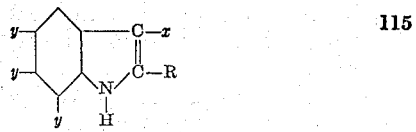

wherein one $y$ stands for a sulphonic acid group, the other $y$'s stand for hydrogen, R stands for methyl, ethyl or a radical of the benzene series, $x$ stands for hydrogen or methyl, but R and $x$ not simultaneously representing a radical of the benzene series and methyl, being generally colorless crystalline substances, in the form of their alkali metal salts easily soluble in water and being valuable intermediate products in the manufacture of dyestuffs.

10. As new products phenyl-indol-sulphonic acids of the probable general formula:

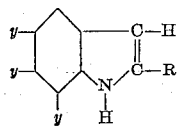

wherein one y stands for a sulphonic acid group, the other y's stand for hydrogen and wherein R stands for a radical of the benzene series, being generally colorless crystalline substances, in the form of their alkali metal salts easily soluble in water and being valuable intermediate products in the manufacture of dyestuffs.

11. As a new product the phenyl-indol-sulphonic acid of the following formula:

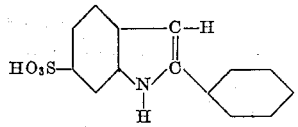

being a colorless crystalline substance, in the form of its alkali metal salts easily soluble in water and being a valuable intermediate product in the manufacture of dyestuffs.

12. As new products phenyl-indol-sulphonic acids of the probable general formula:

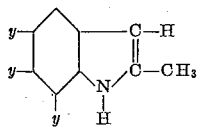

wherein one y stands for a sulphonic acid group, the other y's stand for hydrogen, being generally colorless crystalline substances, in the form of their alkali metal salts easily soluble in water and being valuable intermediate products in the manufacture of dyestuffs.

13. As a new product the phenyl-indol-sulphonic acid of the following formula:

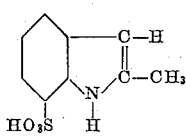

being a colorless crystalline substance, in the form of its alkali metal salts easily soluble in water and being a valuable intermediate product in the manufacture of dyestuffs.

14. As new products phenyl-indol-sulphonic acids of the probable general formula:

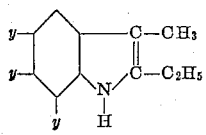

wherein one y stands for a sulphonic acid group, the other y's stand for hydrogen, being generally colorless crystalline substances, in the form of their alkali metal salts easily soluble in water and being valuable intermediate products in the manufacture of dyestuffs.

15. As a new product the phenyl-indol-sulphonic acid of the following formula:

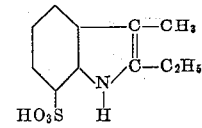

being a colorless crystalline substance, in the form of its alkali metal salts easily soluble in water and being a valuable intermediate product in the manufacture of dyestuffs.

In testimony whereof, we affix our signatures.

EDUARD TSCHUNKUR.
FRITZ BALLAUF.
ERNST HERDIECKERHOFF.